(12) United States Patent
Ikeya et al.

(10) Patent No.: US 10,493,834 B2
(45) Date of Patent: Dec. 3, 2019

(54) VEHICLE

(71) Applicant: HONDA MOTOR CO., LTD., Tokyo (JP)

(72) Inventors: Tsubasa Ikeya, Wako (JP); Tetsuya Takezawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 15/524,360

(22) PCT Filed: Oct. 22, 2015

(86) PCT No.: PCT/JP2015/079875
§ 371 (c)(1),
(2) Date: May 4, 2017

(87) PCT Pub. No.: WO2016/072286
PCT Pub. Date: May 12, 2016

(65) Prior Publication Data
US 2018/0272851 A1    Sep. 27, 2018

(30) Foreign Application Priority Data
Nov. 7, 2014   (JP) ................................ 2014-227046

(51) Int. Cl.
*B60K 1/04*    (2019.01)
*B62D 25/20*   (2006.01)
(Continued)

(52) U.S. Cl.
CPC ................ *B60K 1/04* (2013.01); *B60L 50/64* (2019.02); *B62D 25/20* (2013.01);
(Continued)

(58) Field of Classification Search
CPC .............. B60K 1/04; B60K 2001/0427; B60K 2001/0494; B60K 2001/005; B60L 11/1879
See application file for complete search history.

(56) References Cited

U.S. PATENT DOCUMENTS 4,216,839 A * 8/1980 Gould ...................... B60K 1/04
                                                        180/65.1
5,897,155 A * 4/1999 Kerner ................... B60H 1/247
                                                        296/37.8
(Continued)

FOREIGN PATENT DOCUMENTS

CN        202294219 U      7/2012
DE     102009006990 A1 *   8/2010 ............... B60K 1/04
(Continued)

OTHER PUBLICATIONS

International Search Report dated Jan. 12, 2016, issued in counterpart International Application No. PCT/JP2015/079875 (2 pages).
(Continued)

*Primary Examiner* — Emma K Frick
(74) *Attorney, Agent, or Firm* — Westerman, Hattori, Daniels & Adrian, LLP

(57) ABSTRACT

A vehicle including: a floor panel; a pair of left and right front seats which are disposed on the floor panel; and a high-voltage battery which is disposed between the front seats and which is held on a frame member, wherein a guide member which guides the frame member is provided between the front seats on the floor panel, and wherein the guide member has a pair of left and right guide rails and a positioning portion which controls a position of the frame member in relation to the guide member in at least a front-rear direction.

6 Claims, 14 Drawing Sheets

(51) Int. Cl.
*B60L 50/64* (2019.01)
*B60K 1/00* (2006.01)

(52) U.S. Cl.
CPC ............ *B60K 2001/005* (2013.01); *B60K 2001/0427* (2013.01); *B60K 2001/0494* (2013.01)

(56) References Cited

U.S. PATENT DOCUMENTS

| | | | | |
|---|---|---|---|---|
| 6,435,587 | B1* | 8/2002 | Flowerday | B60N 3/08 220/345.5 |
| 6,811,197 | B1* | 11/2004 | Grabowski | B60R 7/04 180/68.5 |
| 6,921,118 | B2* | 7/2005 | Clark | B60N 3/102 296/24.34 |
| 7,416,235 | B2* | 8/2008 | Rajappa | B60R 7/04 296/24.34 |
| 7,429,068 | B2* | 9/2008 | Busha | B60N 3/101 296/24.34 |
| 7,810,596 | B2* | 10/2010 | Tsuchiya | B60K 1/04 180/68.1 |
| 7,900,728 | B2* | 3/2011 | Suzuki | B60K 1/04 180/65.29 |
| 8,479,858 | B2* | 7/2013 | Kodaira | B60K 1/04 180/68.5 |
| 8,673,467 | B2* | 3/2014 | Katano | B60K 1/04 429/7 |
| 8,770,331 | B2* | 7/2014 | Lim | B60K 1/04 180/68.5 |
| 2006/0131910 | A1* | 6/2006 | Cowelchuk | B60R 7/04 296/24.34 |
| 2008/0047767 | A1* | 2/2008 | Tsuchiya | H01M 2/1072 180/68.5 |
| 2008/0164081 | A1* | 7/2008 | Watanabe | B60H 1/00278 180/68.5 |
| 2008/0303302 | A1* | 12/2008 | Sturt | B60R 7/04 296/24.34 |
| 2008/0315629 | A1* | 12/2008 | Abe | B62D 21/157 296/193.07 |
| 2009/0317692 | A1* | 12/2009 | Matsumoto | B60K 11/06 429/415 |
| 2010/0001553 | A1* | 1/2010 | Yoda | B60K 1/04 296/193.07 |
| 2010/0175940 | A1* | 7/2010 | Taneda | B60K 1/04 180/68.5 |
| 2010/0213741 | A1* | 8/2010 | Suzuki | B60K 1/04 296/193.07 |
| 2010/0244486 | A1* | 9/2010 | Yamaki | B60N 2/4235 296/187.08 |
| 2010/0244489 | A1 | 9/2010 | Shiono et al. | |
| 2012/0052345 | A1* | 3/2012 | Kai | B60L 11/1861 429/61 |
| 2012/0118653 | A1* | 5/2012 | Ogihara | B60K 1/04 180/65.8 |
| 2013/0140101 | A1 | 6/2013 | Lim et al. | |
| 2015/0147613 | A1* | 5/2015 | Hayashida | H01M 2/1072 429/90 |
| 2016/0344221 | A1* | 11/2016 | Kramer | H02J 7/025 |
| 2017/0072861 | A1* | 3/2017 | Kariya | B60R 7/04 |
| 2017/0088181 | A1* | 3/2017 | Tsukada | B60K 1/04 |
| 2017/0088182 | A1* | 3/2017 | Hara | B60K 1/04 |
| 2017/0190295 | A1* | 7/2017 | Ogawa | B60R 7/04 |
| 2017/0210314 | A1* | 7/2017 | Inagaki | B60R 7/04 |
| 2017/0320383 | A1* | 11/2017 | Ikeuchi | B60K 1/04 |
| 2017/0327058 | A1* | 11/2017 | Takezawa | B60K 1/04 |
| 2017/0341482 | A1* | 11/2017 | Takezawa | B60K 1/04 |
| 2017/0358786 | A1* | 12/2017 | Ikeuchi | B60K 1/04 |
| 2019/0009661 | A1* | 1/2019 | Okamura | B60K 1/04 |

FOREIGN PATENT DOCUMENTS

| | | | | |
|---|---|---|---|---|
| DE | 102010011890 | A1 * | 9/2011 | ......... B60K 1/04 |
| DE | 102010032072 | A1 * | 1/2012 | ......... B60K 1/02 |
| DE | 102011115763 | A1 * | 4/2013 | ....... B62D 21/157 |
| DE | 102011119540 | A1 * | 5/2013 | ....... B62D 21/157 |
| DE | 102013000626 | A1 * | 7/2014 | ......... B62D 25/20 |
| DE | 102016216367 | A1 * | 3/2017 | ......... B60K 1/04 |
| JP | 10-22667 | A | 1/1998 | |
| JP | 10-284850 | A | 10/1998 | |
| JP | 2008-149752 | A | 7/2008 | |
| JP | 2010-228561 | A | 10/2010 | |
| JP | 2012-126306 | A | 7/2012 | |
| JP | 2013-86564 | A | 5/2013 | |
| JP | 2013-116724 | A | 6/2013 | |

OTHER PUBLICATIONS

Office Action dated Sep. 30, 2018, issued in counterpart Chinese Application No. 201580060041.2, with English translation (13 pages).

* cited by examiner

VEHICLE

TECHNICAL FIELD

The present invention relates to a vehicle and more particularly to a vehicle in which a high-voltage battery is disposed between front seats.

BACKGROUND ART

In a hybrid electric vehicle and an electric vehicle, a high-voltage battery is mounted as a drive source for an electric motor. In recent years, it has been under study to dispose a high-voltage battery within a passenger compartment, and battery installation mechanisms have been proposed in which a high-voltage battery is disposed between a pair of front seats which are aligned side by side in a left-right direction of a vehicle (for example, refer to Patent Literatures 1, 2).

Patent Literature 1 discloses a power supply unit installing construction of installing a power supply unit on a vehicle in which a battery pack disposed between front seats is made to move freely in a front-rear direction of the vehicle and in which the battery pack moves away from the driver's seat so as to reduce the level of noise transmitted to a passenger. Additionally, Patent Literature 2 discloses a positioning mechanism configured to position a battery unit disposed between front seats in relation to a vehicle body. The positioning mechanism includes a pin which is provided on the battery unit and a guide member which is provided to the vehicle body and configured to guide the pin towards a groove into which the pin is inserted, and is designed to facilitate the positioning of the battery unit when the battery unit is built in.

PRIOR ART LITERATURE

Patent Literature

Patent Literature 1: JP-A-2008-149752
Patent Literature 2: JP-A-2013-86564

SUMMARY OF THE INVENTION

Problem that the Invention is to Solve

However, Patent Literature 1 is such that the battery pack is moved in the front-rear direction of the vehicle according to the position of a seat on which a passenger is seated so as to reduce the level of noise reaching the passenger from the battery pack to thereby improve the quietness in the passenger compartment, and therefore, nothing is taken into consideration in relation to the building performance of the battery pack. In Patent Literature 2, for inserting the pin provided on the battery unit into the groove on the guide member which is provided on the vehicle body, the battery unit needs to be moved horizontally to a position where the relative positions of the pin and the groove substantially coincide with each other, whereafter the battery unit is lowered. In this process, it is difficult to visually confirm the positions of the pin and the groove, and hence, a further improvement has been desired. When the battery unit is removed, the battery unit needs to be lifted upwards in a vertical direction, and in this respect, too, there still remains room for improvement.

The invention provides a vehicle which has superior building properties of a high-voltage battery by adopting a configuration in which a frame member which holds a high-voltage battery is guided by a guide member provided on a floor panel so as to position easily the high-voltage battery in relation to the floor panel.

Means for Solving the Problem

The invention provides the following aspects.

According to a first aspect of the invention, there is provided a vehicle (e.g., a vehicle 10 in embodiment) including:

a floor panel (e.g., a floor panel 11 in embodiment);

a pair of left and right front seats (e.g., a left front seat 14L, a right front seat 14R in embodiment) which are disposed on the floor panel; and a high-voltage battery (e.g., high-voltage batteries 32 in embodiment) which is disposed between the front seats and which is held on a frame member (e.g., a lower frame member 31D in embodiment), wherein a guide member (e.g., a guide member 58 in embodiment) which guides the frame member is provided between the front seats on the floor panel, and wherein the guide member has a pair of left and right guide rails (e.g., guide rails 60 in embodiment) and a positioning portion (e.g., recessed portions 61 in embodiment) which controls a position of the frame member in relation to the guide member in at least a front-rear direction.

According to a second aspect, in the first aspect, the pair of left and right guide rails have width increasing portions (e.g., width increasing portions 60b in embodiment) which expand gradually transversely as the width increasing portions extend from a rear to a front, and the frame member has a pair of left and right side wall portions (e.g., side wall portions 47 in embodiment) which define a transverse space (e.g., an inner transverse space W2 in embodiment) that is wider than a transverse space defined between the guide rails (e.g., a transverse space W1 in embodiment) and which extend downwards from a bottom surface (e.g., a bottom surface 40 in embodiment).

According to a third aspect, in the first or second aspect, a center tunnel (e.g., a center tunnel 12 in embodiment) having a space of a trapezoidal cross section is formed on the floor panel so as to extend in the front-rear direction, the high-voltage battery is disposed on the center tunnel, leg portions (e.g., leg portions 48 in embodiment) are provided on the frame member so as to extend obliquely downwards along the center tunnel, and the leg portions are fastened to side inclined surfaces (e.g., side inclined surfaces 12b in embodiment) of the center tunnel.

According to a fourth aspect, in the second aspect, the frame member has a projecting portion (e.g., projecting portions 49 in embodiment) which projects downwards on the bottom surface, and the guide member has, as the positioning portion, a recessed portion (e.g., the recessed portions 61 in embodiment) which fits on the projecting portion.

According to a fifth aspect, in the second aspect, the guide rails and the bottom surface are not in contact in a state that the frame member is attached to the floor panel.

According to a sixth aspect, in any one of the first to fifth aspects, the guide member has, separately from the positioning portion, a stopper (e.g., stoppers 62 in embodiment) which restricts the frame member from riding over the positioning portion to slide further forwards.

Advantages of the Invention

According to the first aspect, in building the high-voltage battery held on the frame member on the floor panel, the high-voltage battery can be moved to slide to a installing position while guiding the frame member by the guide rails of the guide member, whereby the working properties are improved. Since the front-rear position of the frame member in relation to the guide member is controlled by the positioning portion, the high-voltage battery can easily be positioned in relation to the floor panel.

According to the second aspect, the high-voltage battery can easily be positioned in relation to a left-right direction by moving the high-voltage battery so as to slide from the rear to the front along the guide member and guiding the pair of side wall portions of the frame member by the width increasing portions of the guide rails which expand gradually transversely as the width increasing portions extend from the rear to the front.

According to the third aspect, since the fastening points of the leg portions of the frame member and the center tunnel exist on the side inclined surfaces of the center tunnel which differs from the guide portion of the guide member for guiding the frame member, the building work can be performed while looking at the fastening point. Additionally, the fastening work is facilitated.

According to the fourth aspect, the projecting portion of the frame member is fitted in the recessed portion of the guide member by slide moving the high-voltage battery on the guide member, whereby the high-voltage battery can be positioned not only in the front-rear direction but also in a height direction in an ensured fashion. Additionally, the high-voltage battery can be built on while preventing the interference of the leg portions of the frame member with the center tunnel, whereby the working efficiency is improved.

According to the fifth aspect, the guide rails do not have to hold the frame member but should have only a function to guide the frame member, and therefore, the guide rails do not have to have such a strong rigidity for holding the frame member.

According to the sixth aspect, the high-voltage battery can be built on in the correct position by restricting the frame member from moving further forwards erroneously by bringing the frame member into abutment with the stopper.

MODE FOR CARRYING OUT THE INVENTION

Figure 1:
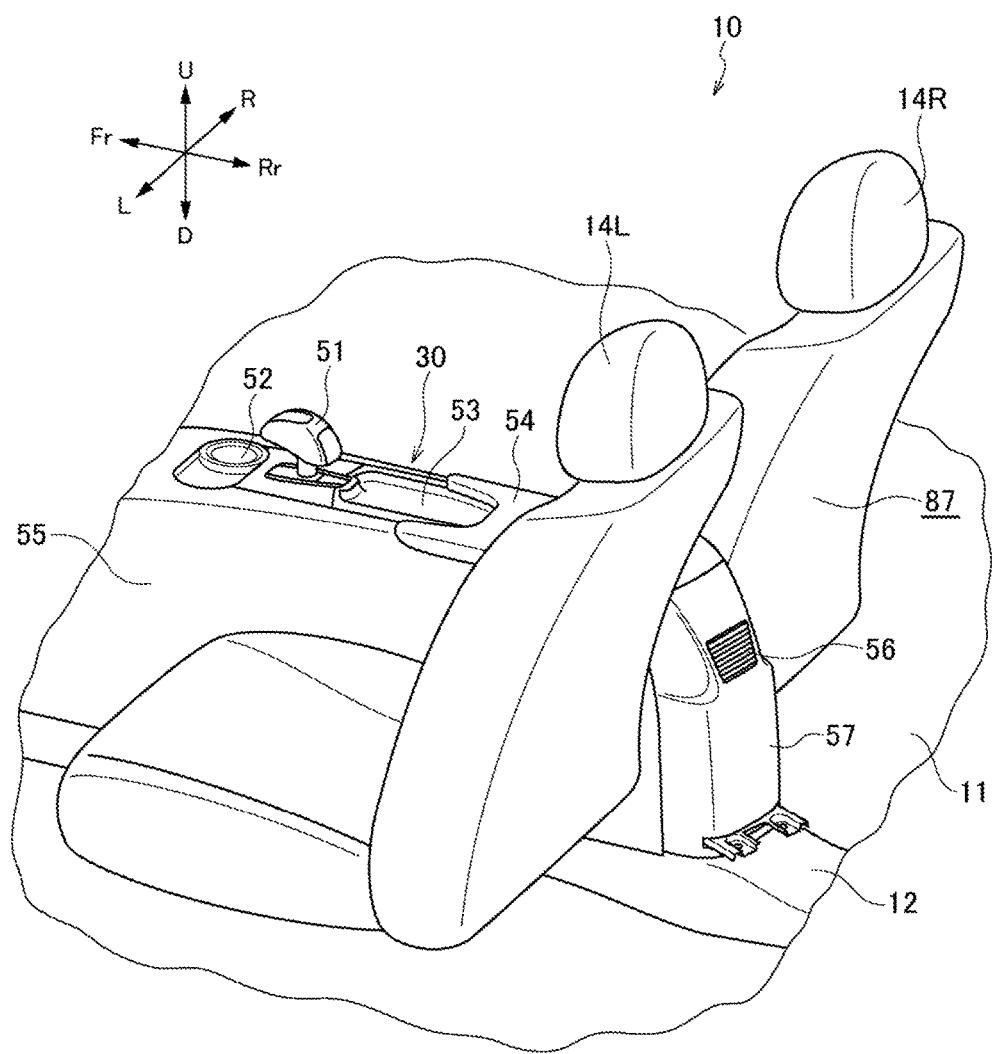
FIG. 1 is a perspective view showing front seats and a center console which is disposed between the front seats of a vehicle according to an embodiment of the invention.

Hereinafter, a vehicle according to one embodiment of the invention will be described by reference to the drawings. The drawings should be seen in a direction in which given reference numerals look normal. In the following description, front, rear, left, right, up and down denote accordingly directions as seen from a driver of the vehicle. The front, rear, left, right, up and down sides of the vehicle are denoted by Fr, Rr, L, R, U and D, respectively.

Figure 2:
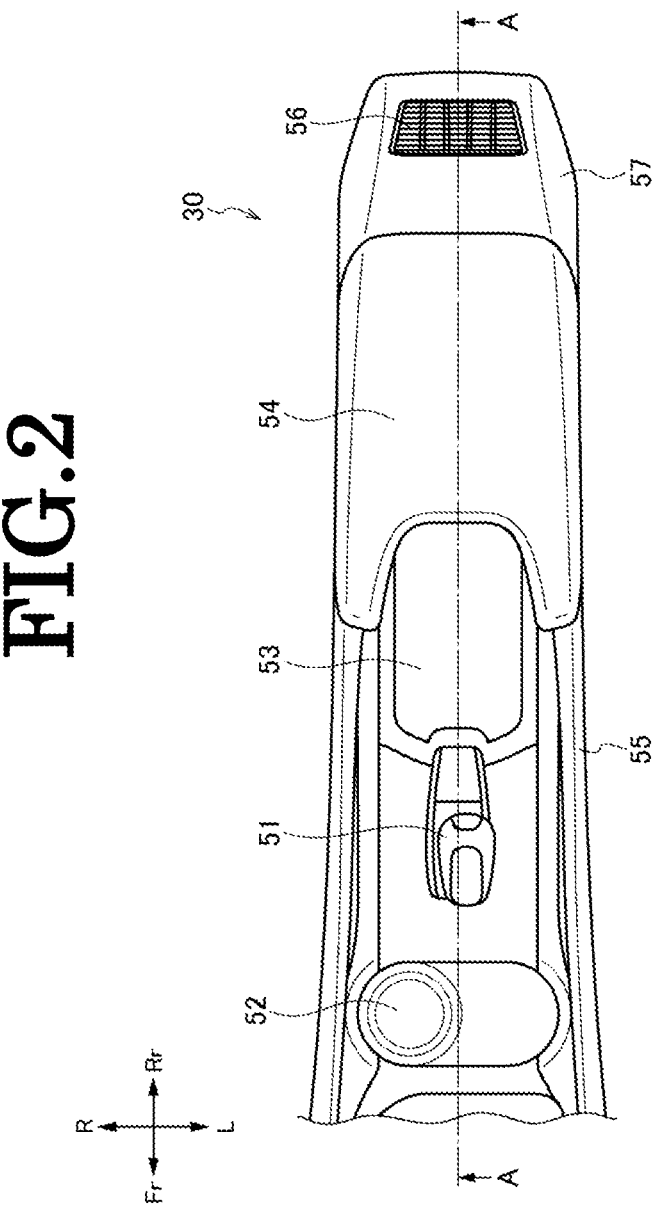
FIG. 2 is a plan view of the center console.
Figure 3:
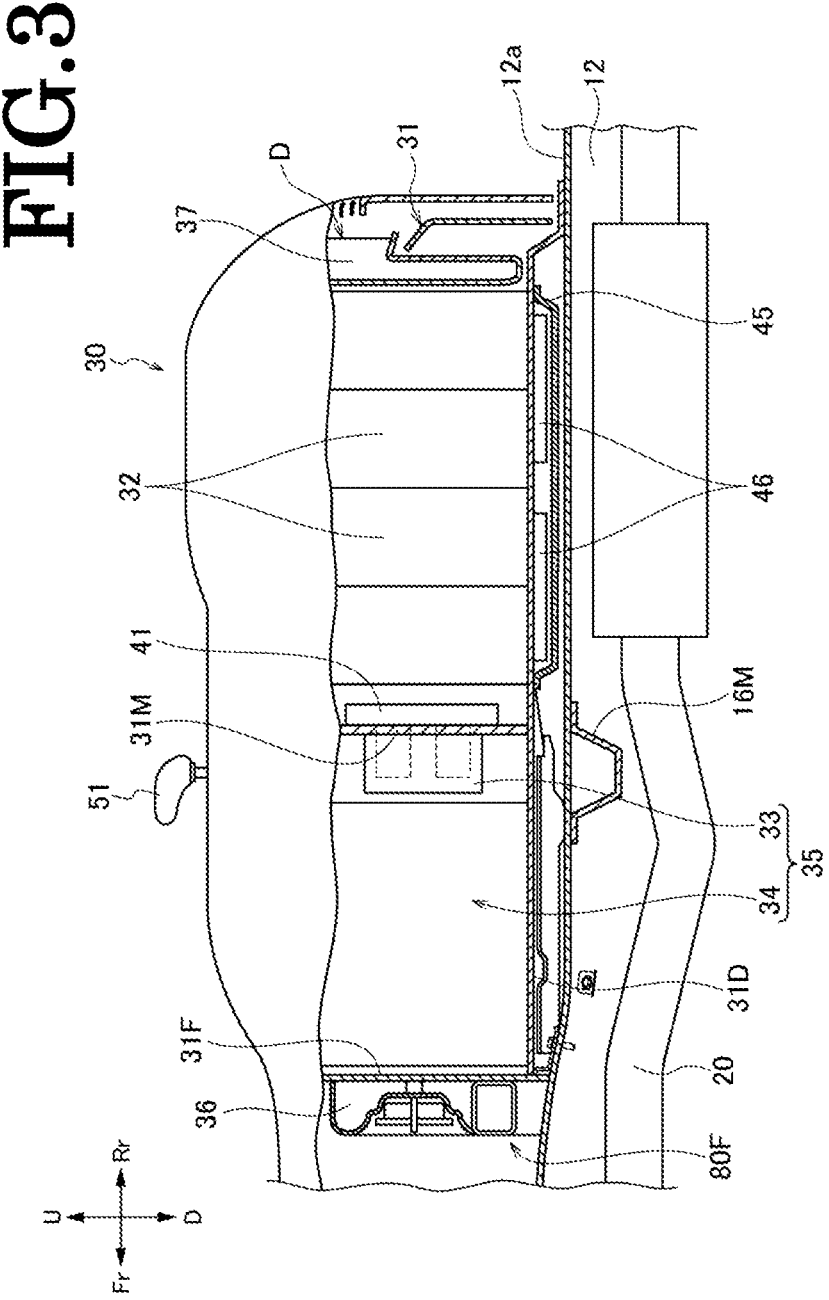
FIG. 3 is a partial sectional view taken along a line A-A in FIG. 2.
Figure 4:
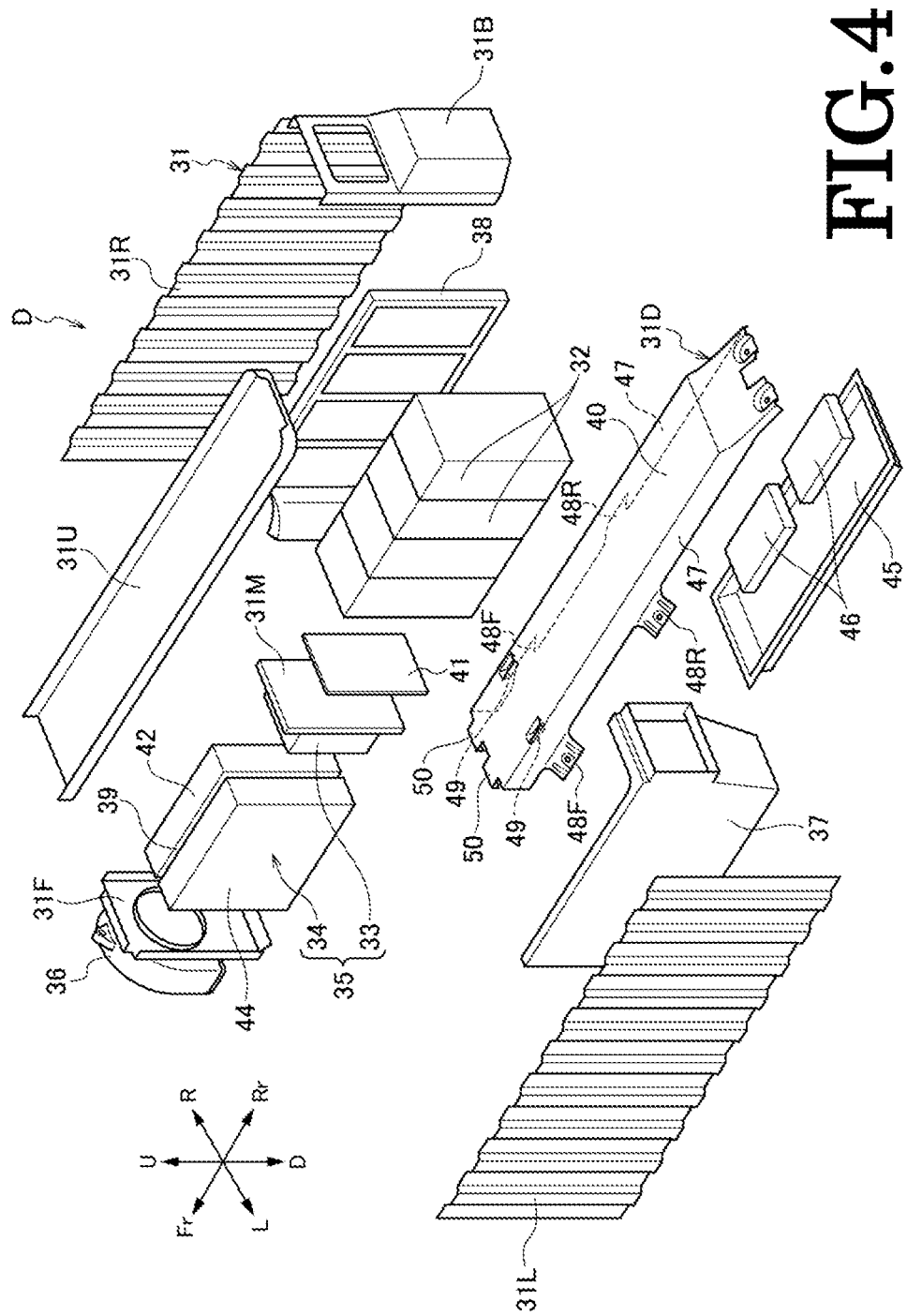
FIG. 4 is an exploded perspective view of an electric device accommodated in the center console.
Figure 5:
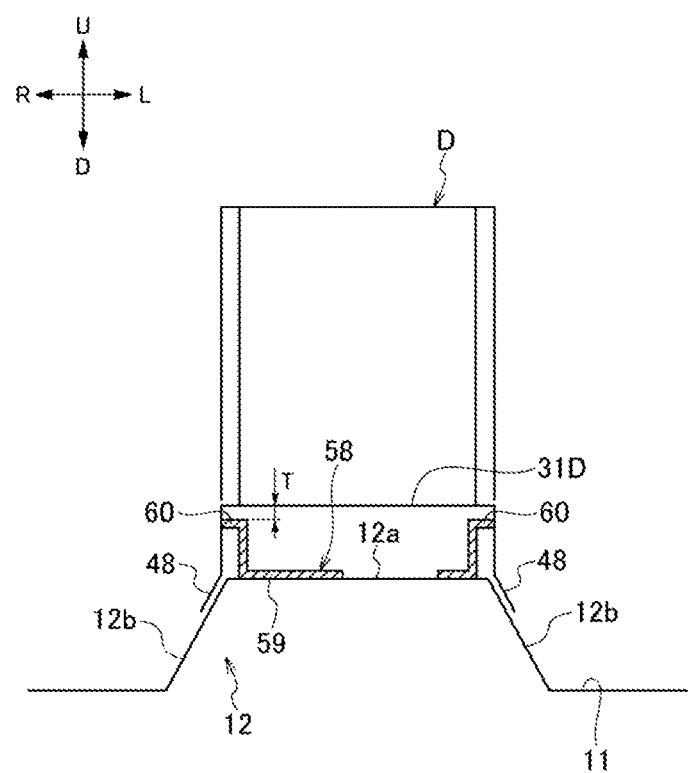
FIG. 5 is a vertical sectional view of the electric device which is fixed on to the center console.

FIG. 1 is a perspective view showing front seats and a center console which is disposed between the front seats of the vehicle according to the embodiment of the invention, FIG. 2 is a plan view of the center console, FIG. 3 is a partial sectional view of the center console, FIG. 4 is an exploded perspective view of an electric device D, and FIG. 5 is a vertical sectional view of the electric device which is fixed on to the center tunnel.

As shown in FIGS. 1 to 3, and 5, in the vehicle 10 of this embodiment, a center console 30 is disposed on a center tunnel 12 having a substantially trapezoidal cross section which is formed on a floor panel 11 between a left front seat 14L and a right front seat 14R so as to extend in a front-rear direction, and an electric device D is installed in the center console 30. A guide member 58 is fixed to an upper surface 12a of the center tunnel 12, and this guide member 58 positions the electric device D by guiding a frame member 31 which holds the electric device D when the electric device is built in. In FIG. 3, the numeral 20 denotes an exhaust pipe disposed in the center tunnel 12, and the numeral 16M denotes a center cross member 16M for reinforcing the center tunnel 12 In figures from FIG. 3 on, the exhaust pipe 20 and the center cross member 16M are omitted from illustration.

<Center Console>

The center console 30 is disposed between a left front seat 14L and a right front seat 14R, and an interior space thereof is covered by an external cover 55 on an upper surface of which a cup holder 52, a shift knob 51, a small article accommodating tray 53 and an armrest 54 for front seat passengers are provided sequentially in that order from the front. A cover member 57 in which an intake grille 56 is provided is attached to a rear end of the external cover 55. The intake grille 56 takes in air inside the passenger compartment 87 as cooling air for the electric device D when a cooling fan 36, which will be described later, is activated.

<Electric Device>

As shown in FIG. 4, the electric device D includes high-voltage batteries 32, an ECU 41, and high-voltage system equipment 35, and these high-voltage batteries 32, ECU 41, and high-voltage system equipment 35 are made into a unit by being held by the frame member 31. The frame member 31 is made up as a result of an upper frame member 31U, a lower frame member 31D, and a middle frame member 31M which joins the upper frame member 31U and the lower frame member 31D together being surrounded by a front cover member 31F, a left cover member 31L, a right cover member 31R and a rear cover member 31B. The lower frame member 31D will be described in detail later.

The high-voltage batteries 32, the ECU 41 and the high-voltage system equipment 35 are disposed sequentially in this order from the rear of the vehicle. The high-voltage system equipment 35 includes a junction box 33 which is attached to a front surface of the middle frame member 31M and a converter (PCU) 34 which is disposed ahead of the junction box 33 to convert the voltages of the high-voltage batteries 32. The ECU 41 described above is attached to a rear surface of the middle frame member 31M. The converter (PCU) 34 includes a DC-DC converter 42 and an inverter 44, and these DC-DC converter 42 and inverter 44 are disposed transversely side by side in a space defined between the front cover member 31F and the junction box 33.

An intake duct 37 is attached to left side surfaces of the high-voltage batteries 32 to be disposed between the high-voltage batteries 32 and the left cover member 31L, and a discharge duct 38 is attached to right side surfaces of the high-voltage batteries 32 to be disposed between the high-voltage batteries 32 and the right cover member 31R. Cell voltage sensors (CVS) 46 are fixed to a lower surface of the lower frame member 31D and are covered by a CVS cover 45. The electric device D is fixed to the center tunnel 12 as a result of the lower frame member 31D being fastened to the center tunnel 12 with bolts. The cooling fan 36 is attached to the front surface of the front cover member 31F. Air taken in from the intake grille 56 of the center console 30 by the cooling fan 36 passes sequentially through the intake duct 37, the high-voltage batteries 32, and the discharge duct 38 in that order, then passes from the discharge duct 38 through a cooling passageway 39 defined between the DC-DC converter 42 and the inverter 44, and is then sucked by the cooling fan 36 to be discharged from the cooling fan 36 into a discharge flow path 80F. The discharge flow path 80F is a flow path which discharges cooling air discharged from the cooling fan 36 into the passenger compartment 87 through side trims. Since the discharge flow path 80F is not related directly to the invention, the detailed description thereof will be omitted here.

<Lower Frame>

The lower frame member 31D has a bottom surface 40 having a substantially rectangular plate-like shape, a pair of left and right side wall portions 47 which extend downwards from both sides of the bottom surface 40, a pair of left and right front leg portions 48F which extend obliquely downwards from front portions of the pair of left and right side wall portions 47, a pair of left and right rear leg portions 48R which extend obliquely downwards from rear portions of the pair of left and right side wall portions 47, a pair of projecting portions 49 which are formed at a front portion of the bottom surface 40 so as to lie adjacent to the pair of left and right side wall portions 47 and which project downwards from the bottom surface 40, and abutment portions 50 which are formed so as to be bent downwards from a front end of the bottom surface 40.

The left and right front leg portions 48F and the left and right rear leg portions 48R are hereinafter called as leg portions 48 collectively.

The leg portions 48 are bent at the same angle as an angle at which side inclined surfaces 12b of the center tunnel 12 are inclined, and as will be described later, the leg portions 48 are fastened to the side inclined surfaces 12b of the center tunnel 12 with the bolts 64 (refer to FIG. 5). By doing so, the lower frame member 31D, that is, the electric device D is fixed on to the center tunnel 12.

<Guide Member>

Next, the guide member 58 which is fixed on to the center tunnel 12 will be described by reference to FIG. 6.

Figure 6:
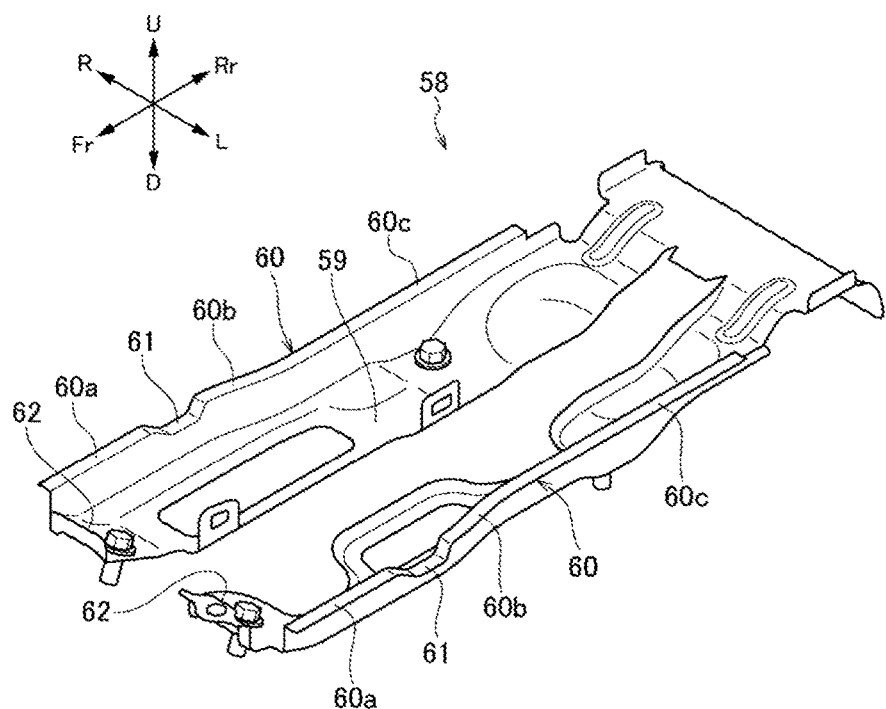
FIG. 6 is a perspective view of a guide member.

FIG. 6 is a perspective view of a guide member 58. The guide member 58 has an attaching portion 59 having a substantially U-shaped plate, a pair of guide rails 60 which rise from left and right side edges of the attaching portion 59 and which are then bent to the left and right, a pair of recessed portions 61 which are formed on upper surfaces of the guide rails 60, and stoppers 62 which are bent upwards from a front end of the attaching portion 59. The stoppers 62 are brought into abutment with the abutment portions 50 of the lower frame member 31D to thereby restrict a further forward movement of the electric device D.

Figure 10:
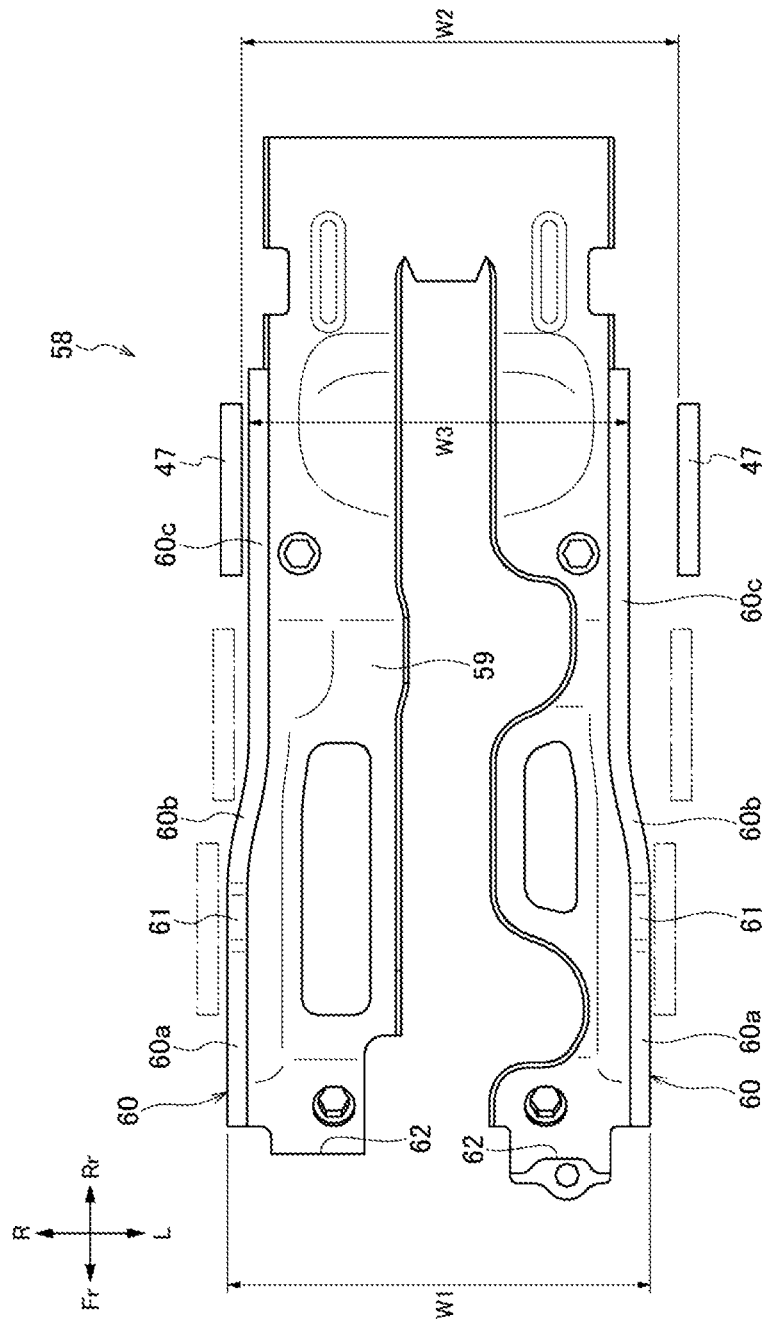
FIG. 10 is an explanatory drawing showing a state where the frame member is guided by the guide rails of the guide member whereby the electric device is positioned in the left-right direction.

Referring to FIG. 10, too, the guide rails 60 have width increasing portions 60b which expand gradually away from each other as they extend from the rear to the front so as to define a transversely increasing space therebetween. The guide rails 60 also have wide width portions 60a formed forwards of the width increasing portions 60b so as to define a transverse space W1 therebetween and narrow width portions 60c formed rearwards of the width increasing portions 60b so as to define a narrow transverse space W3 therebetween. The transverse space W1 defined between the wide width portions 60a is set narrower than a transverse space W2 which is defined between inner sides of the side wall portions 47 of the lower frame member 31D. Namely, in building the electric device D on the center tunnel 12, the pair of guide rails 60 are disposed inside the pair of side wall portions 47 of the lower frame member 31D.

<Building of Electric Device>

Figure 7:
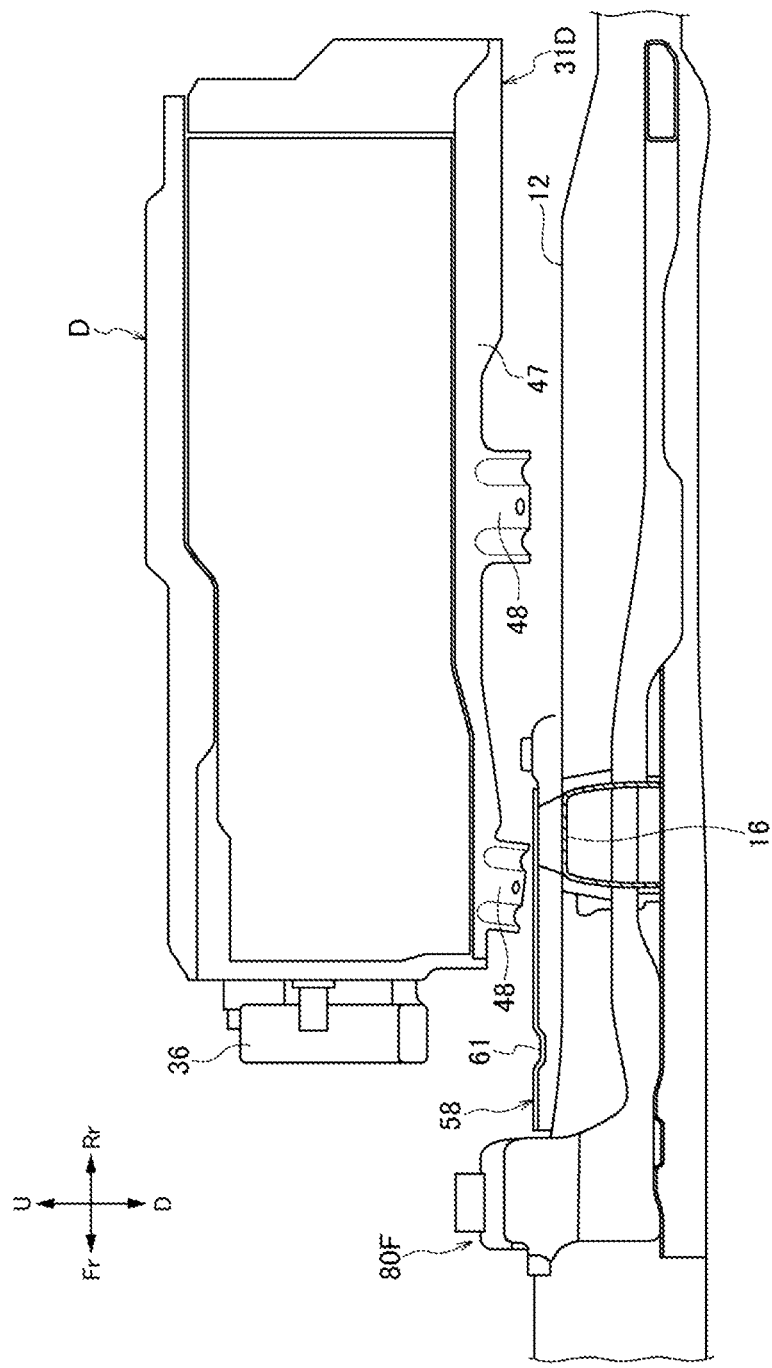
FIG. 7 is a left side view showing a state where the electric device is conveyed on to the center tunnel so as to be built thereon.
Figure 8:
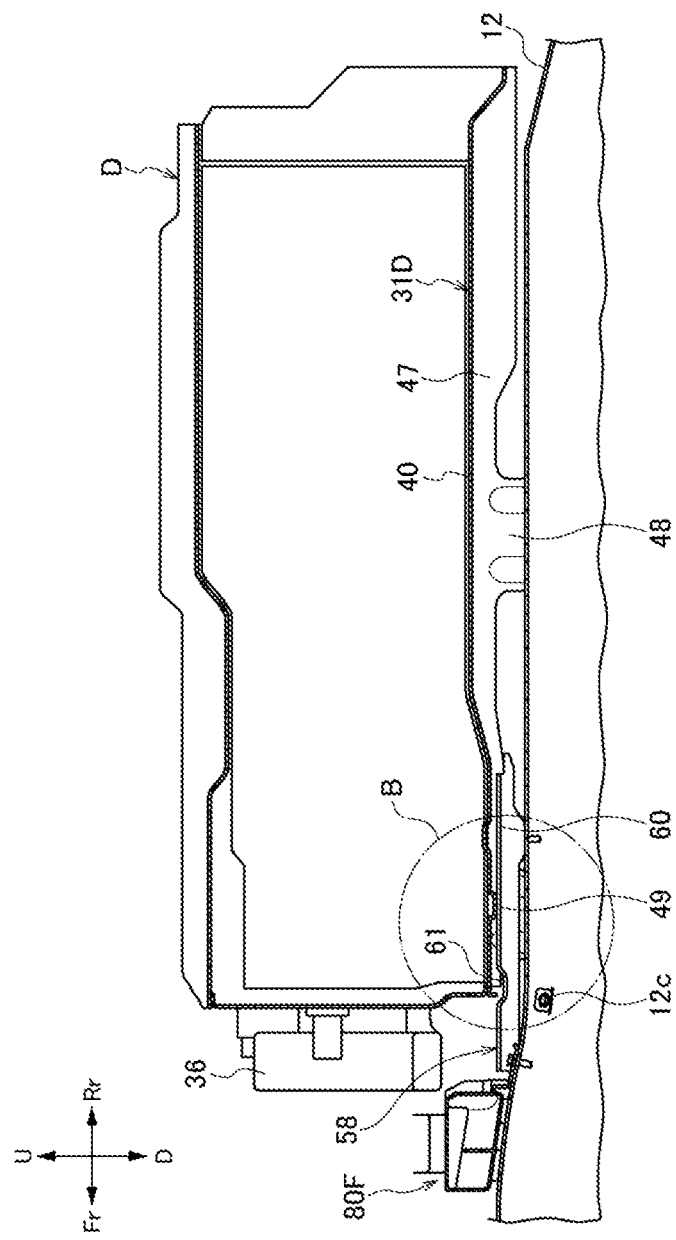
FIG. 8 is a left side view showing a state where the electric device is lowered so that projecting portions of a frame member are brought into contact with guide rails on a guide member.
Figure 9:
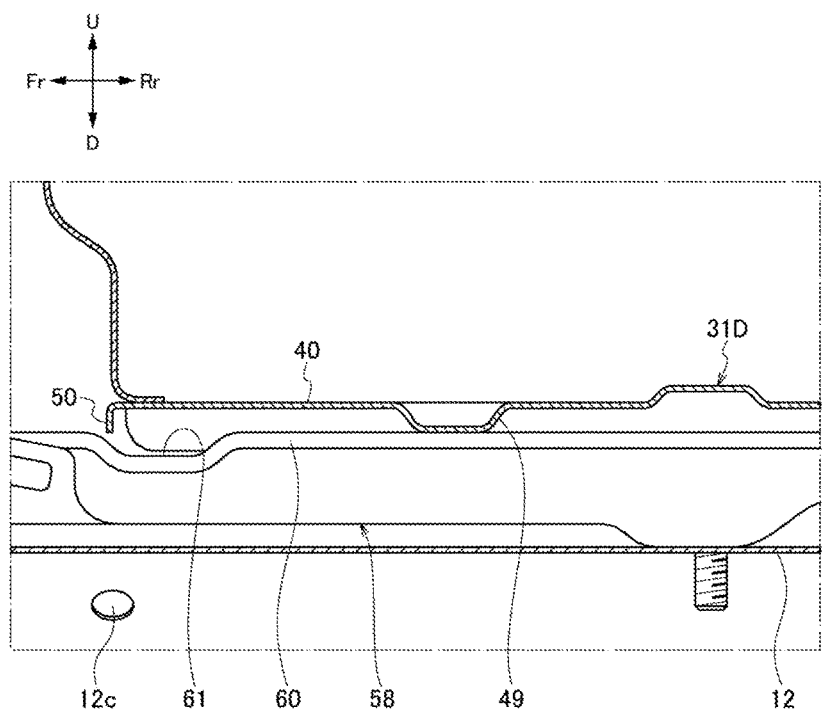
FIG. 9 is an enlarged view of a portion surrounded by a circle B shown in FIG. 9.
Figure 11:
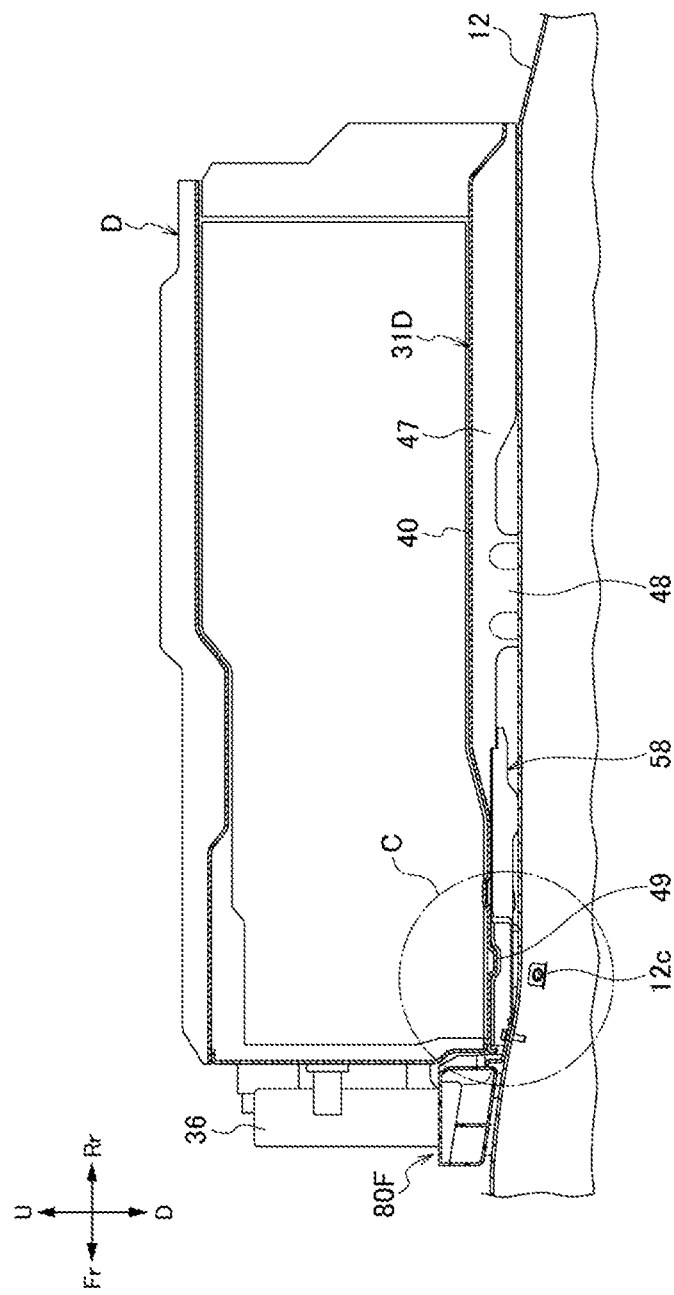
FIG. 11 is a left side view showing a state where the projecting portions of the frame member and recessed portions of the guide member are fitted together whereby the electric device is positioned in a front-rear direction and a height direction.
Figure 12:
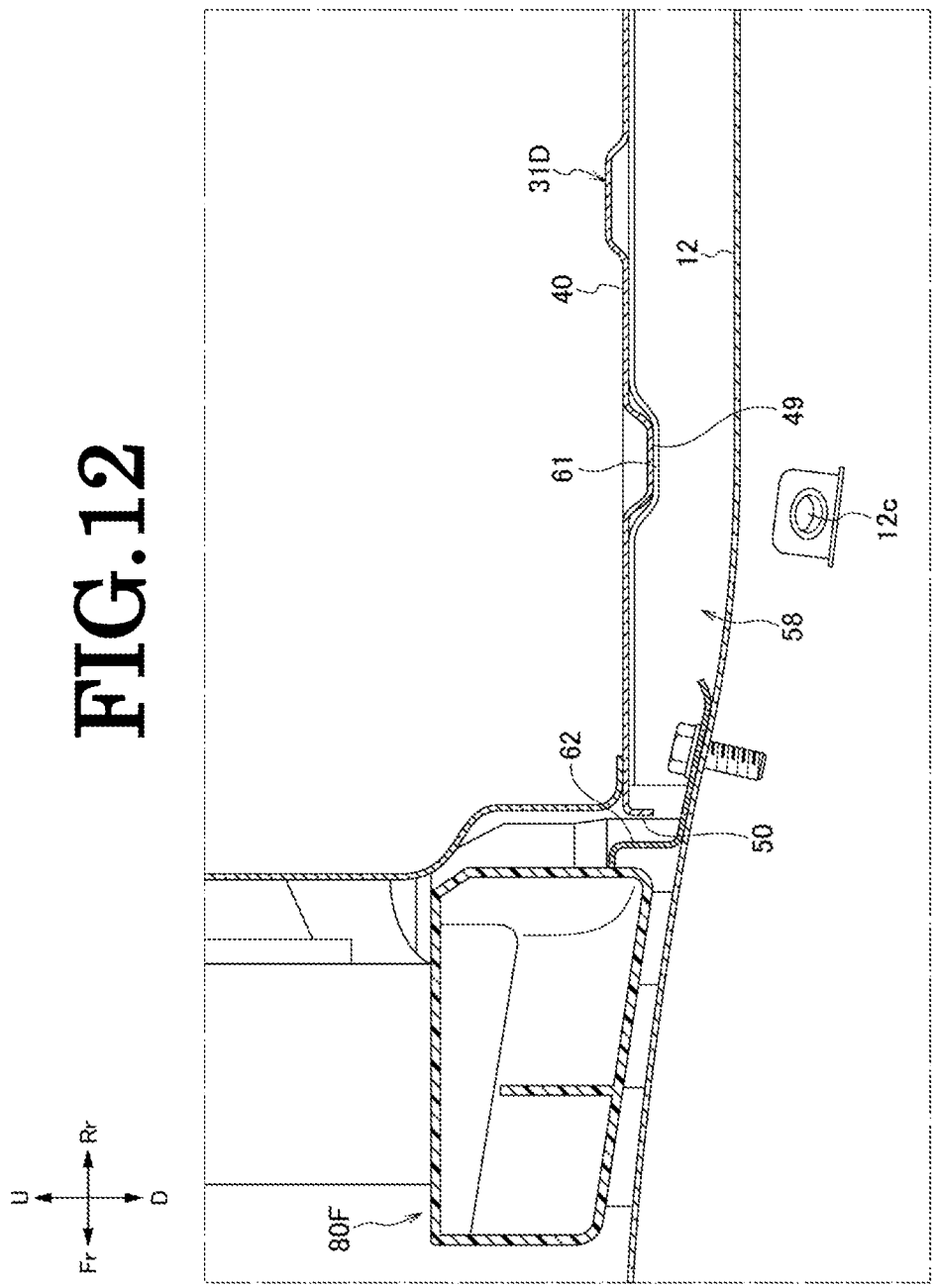
FIG. 12 is an enlarged view of a portion surrounded by a circle C shown in FIG. 11.
Figure 13:
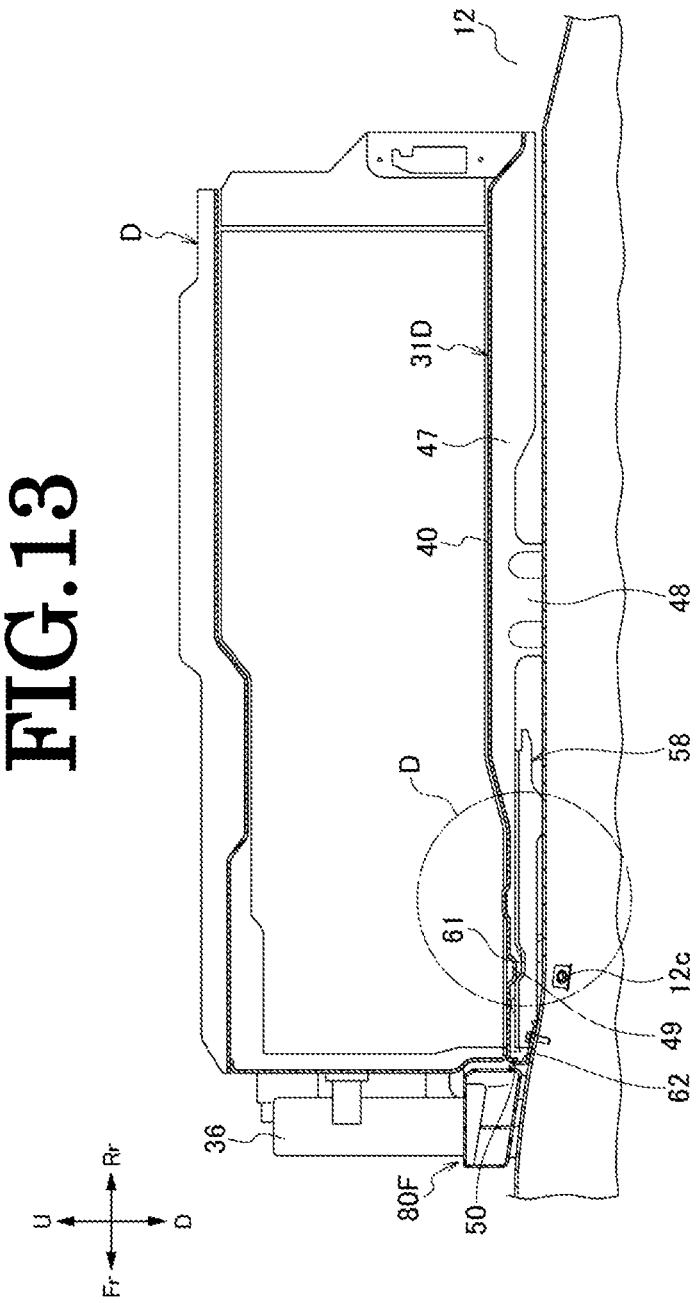
FIG. 13 is a left side view showing a state where the electric device is conveyed forwards beyond a proper installing position whereupon abutment portions of the frame member are brought into abutment with stoppers of the guide member to thereby restrict a further forward movement of the electric device.
Figure 14:
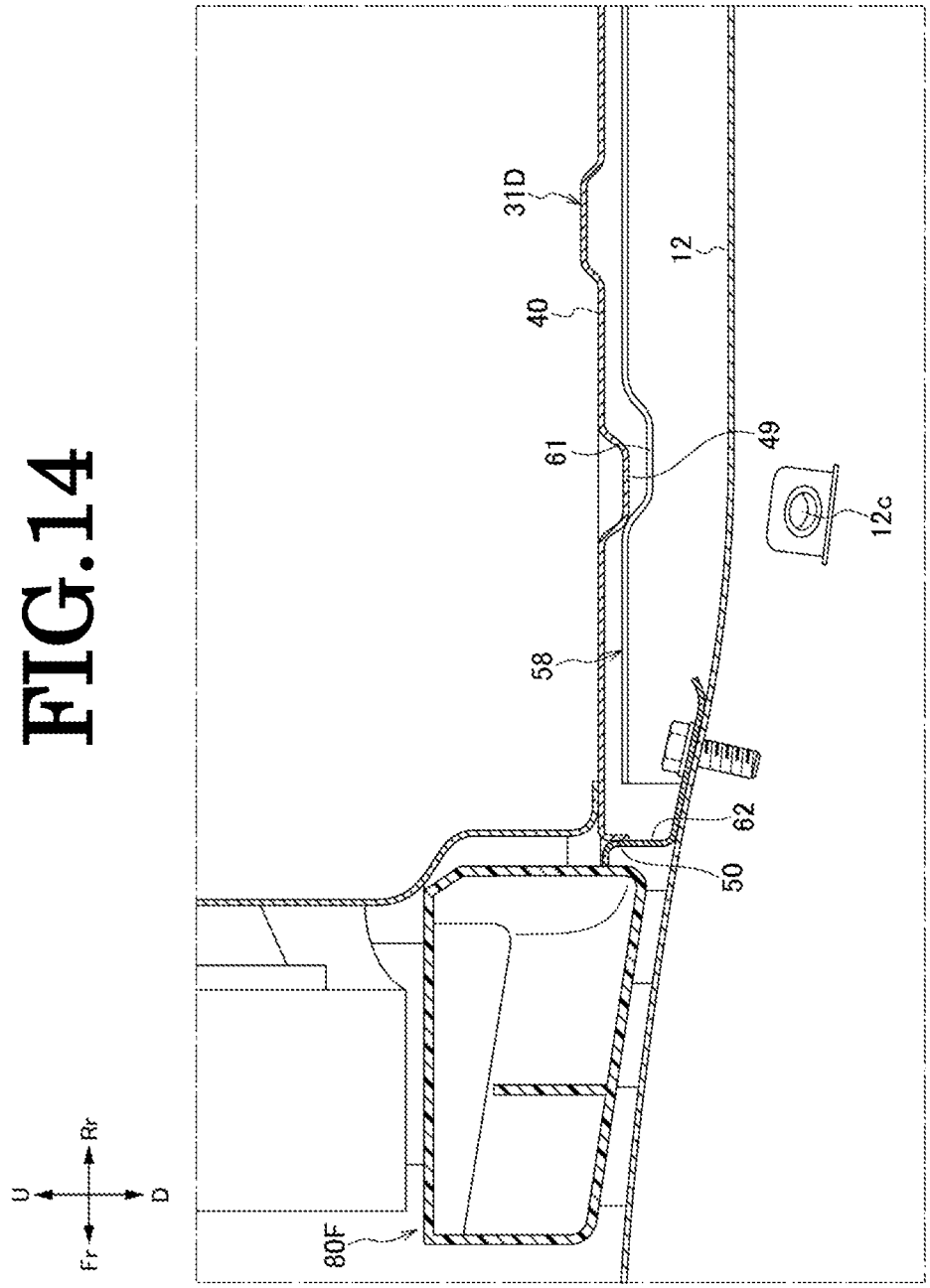
FIG. 14 is an enlarged view of a portion surrounded by a circle D shown in FIG. 13.

Next, a building process of the electric device D on the center tunnel 12 will be described by reference to FIGS. 7 to 14. FIG. 7 is a left side view showing a state where the electric device D is conveyed on to the center tunnel 12, FIG. 8 is a left side view showing a state where the electric device D is lowered so that the projecting portions 49 of the lower frame member 31 are brought into contact with the guide rails 60 of the guide member 58, and FIG. 9 is an enlarged view of a portion surrounded by a circle B shown in FIG. 8. FIG. 10 is an explanatory drawing showing a state where the lower frame member 31D is guided by the guide member 58, so that the electric device D is positioned in the left-right direction. FIG. 11 is a left side view showing a state where the projecting portions 49 of the lower frame member 31 and the recessed portions 61 of the guide member 58 are fitted together whereby the electric device D is positioned in the front-rear direction. FIG. 12 is an enlarged view of a portion surrounded by a circle C shown in FIG. 11. FIG. 13 is a left side view showing a state where the electric device D is conveyed forwards beyond a proper installing position whereupon the abutment portions 50 of the lower frame member 31D are brought into abutment with the stoppers 62 of the guide member 58 to thereby restrict a further forward movement of the electric device D. FIG. 14 is an enlarged view of a portion surrounded by a circle D shown in FIG. 13.

Firstly, as shown in FIG. 7, the electric device D is gripped by, for example, a robot arm in such a state that the electric device D is kept substantially horizontal or is tilted slightly downwards at a front end thereof and is conveyed in a horizontal direction to a position where the front legs of the leg portions 48 of the lower frame member 31D pass forwards the cross member 16 connecting the side sills (not shown) and the center tunnel 12 in the left-right direction.

Next, as shown in FIGS. 8 and 9, the electric device D is lowered until the projecting portions 49 of the lower frame member 31D come into contact with the upper surfaces of the guide rails 60. As this occurs, as shown in FIG. 10, the position of the electric device D is briefly adjusted in the left-right direction so that the pair of side walls 47 of the lower frame member 31D are positioned transversely outwards of the pair of guide rails 60. With the projecting portions 49 of the lower frame member 31D staying in contact with the upper surfaces of the guide rails 60, the four leg portions 48 of the lower frame member 31D are kept staying away from the center tunnel 12, and therefore, the leg portions 48 never constitute an obstacle against a sliding movement of the electric device D, which will be described later.

Then, the electric device D is moved to slide on the pair of guide rails 60 to the front. By doing so, as shown in FIG. 10, the pair of side wall portions 47 of the lower frame member 31D are brought into abutment with the width increasing portions 60b of the guide rails 60. Then, as the electric device D moves further forwards, the electric device D is guided by the width increasing portions 60b to thereby be moved in the left-right direction (upwards in FIG. 10). Namely, the position of the electric device D in relation to the left-right direction is corrected gradually by the width increasing portions 60b, and the pair of side wall portions 47 are then brought into abutment with outer surfaces of the wide width portions 60a of the guide member 58, whereby the electric device D is positioned in relation to the left-right direction.

When the electric device D is caused to slide forwards in that state, as shown in FIGS. 11 and 12, the projecting portions 49 of the lower frame member 31D fit in the recessed portions 61 of the guide member 58, whereby the electric device D is positioned in relation to the front-rear direction and in a height direction. In addition, the four leg portions 48 are brought into abutment with the side inclined surfaces 12b of the center tunnel 12 (refer to FIG. 5). As this occurs, the operator can easily verify that the electric device D has reached the installing position without visually verifying it as a result of the projecting portions 49 of the lower frame member 31D fitting in the recessed portions 61 of the guide member 58. Then, the four leg portions 48 are fastened to the side inclined surfaces 12b of the center tunnel 12 with the bolts 64 which are tightened into fastening holes 12c provided in the side inclined surfaces 12b.

As shown in FIGS. 13 and 14, in case the operator erroneously moves the electric device D forwards beyond the installing position by failing to notice the fitting of the projecting portions 49 of the lower frame member 31D in the recessed portions 61 of the guide member 58, the abutment portions 50 of the lower frame member 31D are brought into abutment with the stoppers 62 of the guide member 58 whereby a further forward movement of the electric device D is restricted. By adopting this configuration, even in case the electric device D moves beyond the installing position, there is no such situation that the members which are disposed nearby are damaged by the interference with the electric device D.

As shown in FIG. 5, in such a state that the leg portions 48 of the lower frame member 31D are attached to the side inclined surfaces 12b of the center tunnel 12, the guide rails 60 and the bottom surface 40 of the lower frame member 31D are not in contact, thereby a gap T being defined therebetween. Consequently, the guide rails 60 do not have to hold the electric device D but only have to function to guide the lower frame member 31D, and therefore, the guide rails 60 do not need a rigidity which is strong enough to hold the electric device D.

In this way, since the electric device D is caused to slide to the installing position while being guided by the guide member 58, the moving locus and position of the electric device D can be controlled with good accuracy, and even with only a small gap defined between the electric device D and the peripheral parts disposed near the electric device D, the electric device D can be moved to the installing position with no interference with the peripheral parts without visually monitoring the gap. By adopting the configuration described above, the building work of the electric device D which is a heavy part is improved, and the load of the operator is reduced.

Thus, as has been described heretofore, according to the vehicle 10 of this embodiment, the guide member 58 for guiding the lower frame member 31D is provided on the floor panel 11 between the left front seat 14L and the right front seat 14R, and the guide member 58 have the pair of left and right guide rails 60 and the recessed portions 61 which control the front-rear position and the height-wise position of the lower frame member 31D in relation to the guide member 58. Therefore, in building the electric device D which is held by the lower frame member 31D, the electric device D can be slid to move to the installing position while guiding the lower frame member 31D by the guide rails 60 of the guide member 58, whereby the working properties are improved. Additionally, since the lower frame member 31D is positioned in relation to the guide member 58 in the front-rear direction of the lower frame member 31D by the recessed portions 61, the electric device D can easily be positioned in relation to the floor panel 11.

The pair of left and right guide rails 60 have the width increasing portions 60b in which the transverse spaces expand gradually from the rear to the front, and the lower frame member 31D has the pair of left and right side wall portions 47 which define therebetween the inner transverse space W2 that is wider than the transverse space W1 defined between the wide width portions 60a and which extend downwards from the bottom surface 40. Thus, the electric device D can be positioned in relation to the left-right direction easily by slide moving the electric device D on the guide rails 60 from the rear to the front while guiding the pair of side wall portions 47 of the lower frame member 31D by the width increasing portions 60b of the guide rails 60.

The center tunnel 12 having the trapezoidal cross section is formed on the floor panel 11 so as to extend in the front-rear direction, and the electric device D is disposed on the center tunnel 12. Since the leg portions 48 which extend obliquely downwards along the center tunnel 12 to thereby be fastened to the side inclined surfaces 12b of the center tunnel 12 are provided on the lower frame member 31D which holds the electric device D, the fastening points between the leg portions 48 of the lower frame member 31D and the center tunnel 12 are disposed on the side inclined surfaces 12b of the center tunnel 12, whereby the fastening work can be performed while looking at the fastening points, thereby facilitating the fastening work.

The lower frame member 31D has the projecting portions 49 which project downwards on the bottom surface 40, and the guide member 58 has the recessed portions 61 which fit on the projecting portions 49. Thus, the electric device D can be positioned not only in the front-rear direction but also in the height direction by slide moving the electric device D on the guide member 58 so that the projecting portions 49 of the lower frame member 31D fit in the recessed portions 61 of the guide member 58. Additionally, the electric device D can be built on while preventing the interference of the leg portions 48 of the lower frame member 31D with the center tunnel 12, whereby the working efficiency is improved.

Since the guide rails 60 and the bottom surface 40 of the lower frame member 31D are not in contact in such a state that the lower frame member 31D, that is, the electric device D is attached to the center tunnel 12, the guide rails 60 do not have to hold the electric device D. Consequently, the guide rails 60 only have to function to guide the lower frame member 31D, and therefore, the guide rails 60 do not have to have such a strong rigidity to hold the electric device D.

Since the guide member 58 has, separately from the recessed portions 61, the stoppers 62 which restrict the lower frame member 31D from riding over the recessed portions 61 to slide further forwards, by bringing the stoppers 62 into abutment with the abutment portions 50 of the lower frame member 31D, the lower frame member 31D can be restricted from moving further forwards erroneously, whereby the electric device D can be built on in the correct position.

The invention is not limited to the embodiment that has been described above and hence can be modified or improved as required. For example, in the embodiment, while the electric device D is fixed directly to the center tunnel 12 which is formed on the floor panel 11 with the bolts, the invention is not limited thereto. Thus, a center tunnel cover which covers the center tunnel 12 may be welded to the floor panel 11, and the electric device D may be fixed to the center tunnel cover. Namely, the center tunnel 12 may be formed by only the floor panel 11 or an integrally formed part in which the floor panel 11 is covered by the center tunnel cover. In the case of the integrally formed part in which the center tunnel 12 is covered by the center tunnel cover, the guide member 58 is fixed to an upper surface of the center tunnel cover. The utilization of the center tunnel cover obviates the necessity of forming bolt holes for fixing the electric device D in the floor panel 11. Additionally, the center tunnel cover also functions as a reinforcement member.

The electric device D may be fixed not only to the center tunnel 12 but also to the floor panel 11.

In the embodiment described above, the high-voltage batteries 32, the ECU 41, and the high-voltage system equipment 35 are held by the frame member 31 so as to be made into the single unit. However, the invention is not limited thereto, and at least the high-voltage batteries 32 only have to be held by the frame member 31.

The recessed portions 61 which controls both the front-rear position and the height-wise position of the lower frame member 31D are described as exemplifying the positioning portions. However, the invention is not limited thereto, and hence, the positioning portions may be such as to control only the front-rear position of the lower frame member 31D.

This patent application is based on Japanese Patent Application (No. 2014-227046) filed on Nov. 7, 2014, the contents of which are incorporated herein by reference.

DESCRIPTION OF REFERENCE NUMERALS AND CHARACTER

10 Vehicle
11 Floor panel
12 Center tunnel
12b Side inclined surface
14L Left front seat (front seat)
14R Right front seat (front seat)
31 Frame member
31D Lower frame member
32 high-voltage battery
40 Bottom surface
47 Side wall portion
48 Leg portion
49 Projecting portion
58 Guide member
60 Guide rail
60b Width increasing portion
61 Recessed portion
62 Stopper
D Electric device
W1 Transverse space of wide width portion
W2 Transverse space between inner sides of side wall portions

The invention claimed is:

1. A vehicle comprising:
a floor panel;
a pair of left and right front seats which are disposed on the floor panel; and
a high-voltage battery which is disposed between the front seats and which is held on a frame member, wherein
a guide member which guides the frame member is provided between the front seats on the floor panel,
the guide member has a pair of left and right guide rails and a positioning portion which controls a position of the frame member in relation to the guide member in at least a front-rear direction,
a center tunnel having a space of a trapezoidal cross section is formed on the floor panel so as to extend in the front-rear direction,
the high-voltage battery is disposed on the center tunnel,
leg portions are provided on the frame member so as to extend obliquely downwards along the center tunnel,
the leg portions are fastened to side inclined surface of the center tunnel,
a space where the guide member is provided is formed between a bottom surface of the frame member and an upper surface of the center tunnel,
the pair of left and right guide rails have width increasing portions which expand gradually transversely as the width increasing portions extend from a rear to a front, and wherein
the frame member has a pair of left and right side wall portions which define a transverse space that is wider than a transverse space defined between the guide rails, the pair of left and right side wall portions extending downwards from the bottom surface of the frame member.

2. The vehicle according to claim 1, wherein
the frame member has a projecting portion which projects downwards from the bottom surface of the frame member, and wherein
the guide member has, as the positioning portion, a recessed portion which fits on the projecting portion.

3. The vehicle according to claim 2, wherein
the projecting portion and the recessed portion position the guide rails and the frame member in a height direction as well as in the front-rear direction.

4. The vehicle according to claim 1, wherein
the guide rails and the bottom surface of the frame member are not in contact with each other in a state that the frame member is attached to the floor panel.

5. The vehicle according to claim 1, wherein
the guide member has, separately from the positioning portion, a stopper which restricts the frame member from riding over the positioning portion to slide further forwards.

6. A vehicle comprising:
a floor panel;
a pair of left and right front seats which are disposed on the floor panel; and
a high-voltage battery which is disposed between the front seats and which is held on a frame member, wherein
a guide member which guides the frame member is provided between the front seats on the floor panel,
the guide member has a pair of left and right guide rails and a positioning portion which controls a position of the frame member in relation to the guide member in at least a front-rear direction,
a center tunnel having a space of a trapezoidal cross section is formed on the floor panel so as to extend in the front-rear direction,
the high-voltage battery is disposed on the center tunnel,
leg portions are provided on the frame member so as to extend obliquely downwards along the center tunnel,
the leg portions are fastened to side inclined surface of the center tunnel,
a space where the guide member is provided is formed between a bottom surface of the frame member and an upper surface of the center tunnel, and
the guide member has, separately from the positioning portion, a stopper which restricts the frame member from riding over the positioning portion to slide further forwards.

* * * * *